(12) United States Patent
Gordon

(10) Patent No.: US 7,376,638 B2
(45) Date of Patent: May 20, 2008

(54) SYSTEM AND METHOD FOR ADDRESSING INEFFICIENT QUERY PROCESSING

(75) Inventor: Mark R. Gordon, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 10/746,961

(22) Filed: Dec. 24, 2003

(65) Prior Publication Data

US 2005/0165741 A1    Jul. 28, 2005

(51) Int. Cl.
    G06F 7/00    (2006.01)
    G06F 17/00    (2006.01)
(52) U.S. Cl. .............................................. 707/2; 707/3
(58) Field of Classification Search .................... 707/2, 707/3
    See application file for complete search history.

(56) References Cited

U.S. PATENT DOCUMENTS

| | | | |
|---|---|---|---|
| 5,778,354 A | 7/1998 | Leslie et al. | |
| 5,848,408 A | 12/1998 | Jakobsson et al. | |
| 5,857,184 A | 1/1999 | Lynch | |
| 5,864,840 A | 1/1999 | Leung et al. | |
| 5,899,986 A | 5/1999 | Ziauddin | |
| 6,189,004 B1 | 2/2001 | Rassen et al. | |
| 6,651,055 B1 * | 11/2003 | Kilmer et al. | 707/3 |
| 2002/0198867 A1 * | 12/2002 | Lohman et al. | 707/3 |
| 2004/0210563 A1 * | 10/2004 | Zait et al. | 707/3 |

OTHER PUBLICATIONS

Stillger et al. "LEO—DB2's LEaring Optimizer" Proccedings of the 27th VLDB Conference, Italy 2001pp. 1-10.*
Lohman et al. "Smart: Making DB2 (More) Automatic" Proceedings of the 28th VLBD Conferance, Hong Kong, China, 2002 pp. 1-3.*
Valentin et al. "DB2 Advisor: An Optimizer Smart Enough to Recomend Its Own Indexes" pp. 1-9.*
"Oracle8 Server Tuning" Jun. 1997 Chapter 22 pp. 22-1-22-32.*

* cited by examiner

*Primary Examiner*—Sam Rimell
*Assistant Examiner*—Cory C Bell
(74) *Attorney, Agent, or Firm*—Douglas A. Lashmitt; Hoffman, Warnick & D'Alessandro LLC

(57) ABSTRACT

A system and method for analyzing predicate usage and proposing solutions to improve query performance. The system comprises a system for collecting performance statistics for database queries; an aggregation system that organizes the performance statistics based on predicate combinations used in the database queries; and an evaluation system that compares the performances of queries having similar predicate combinations. Further features include a problem identification system that identifies a predicate, which when added to a query, results in a low performing query, and a solution proposal system that automatically proposes a solution to address the low performing query.

6 Claims, 9 Drawing Sheets

| COUNT* | Time | Getpages | Grouped rows | Columns | Dimensions | Fact Table |
|---|---|---|---|---|---|---|
| 1000 | 10 | 10000 | 500 | M1.col1a=, M3.col3a= | D1 D2 | F |

FIG. 2

| COUNT* | Time | Getpages | Grouped rows | Columns | Dimensions | Fact Table |
|---|---|---|---|---|---|---|
| 1000 | 10 | 10000 | 500 | M1.col1a=, M3.col3a=, M4.col4-GB | D1 D2 | F |

FIG. 3

| Avg Count | Avg Time | Avg GP | Avg Rows | Execs | Columns | Dimensions | Table |
|---|---|---|---|---|---|---|---|
| 1500 | 12 | 14000 | 600 | 5 | M1.col1a=, M3.col3a= | D1 D2 | F |
| 50 | 15 | 16000 | 25 | 6 | M1.col1a=, M3.col3a=, M5.col5= | D1 D2 D3 | F |
| 500 | 15 | 14000 | 200 | 7 | M1.col1a=, M3.col3a=, M6.col6= | D1 D2 D3 | F |

FIG. 4

| ID | Local Predicates | Dims | Count/sec | GP/count | Added Pred | Added Dim | Count/second | GP/count | Fact Table | Time | Estimated improvement |
|---|---|---|---|---|---|---|---|---|---|---|---|
| 1 | M1.col1a=, M3.col3a= | D1 D2 | 125 | 9.3 | M5.col5= | D3 | 3.3 | 320 | F | 90 | 87.6 |
| 2 | M1.col1a=, M3.col3a= | D1 D1 | 125 | 9.3 | M6.col6= | D3 | 33.3 | 28 | F | 105 | 76.8 |

FIG. 5

| ID | Local Predicates | Dims | Count/sec | GP/count | Added Pred | Added Dim | Count/second | GP/count |
|---|---|---|---|---|---|---|---|---|
| 1 | M1.col1a, M3.col3a | D1 D2 | 125 | 9.3 | M5.col5 | D3 | 3.3 | 320 |
| 2 | M1.col1a, M3.col3a | D1 D1 | 125 | 9.3 | M6.col6 | D3 | 33.3 | 28 |

FIG. 6

| statuid | infocube | db time | count(*) | rows after grouping | Characteristics | querycube list | date |
|---|---|---|---|---|---|---|---|
| KKK | Z | 200 | 50000 | 40 | C | Z | |
| LLL | Z | 400 | 30000 | 20 | CD | Z | |
| MMM | Z | 100 | 10000 | 50 | ABCD | Z | |
| NNN | Z | 200 | 20000 | 20 | ACD | Z | |
| OOO | Z | 300 | 30000 | 30 | AB | Z | |
| PPP | Z | 400 | 60000 | 40 | AD | Z | |
| QQQ | Z | 500 | 70000 | 90 | AE | Z | |
| RRR | Z | 110 | 11000 | 11 | ACF | Z | |
| SSS | Z | 120 | 12000 | 12 | BCF | Z | |
| TTT | Z | 800 | 50000 | 70 | ADF | Z | |

FIG. 7

| statuid | infocube | db time | count(*) | rows after grouping | Chars | querycube | dimension list | date |
|---|---|---|---|---|---|---|---|---|
| KKK | Z | 200 | 50000 | 40 | C | Z | D2 | |
| LLL | Z | 400 | 30000 | 20 | CD | Z | D2 | |
| MMM | Z | 100 | 10000 | 50 | ABCD | Z | D1 D2 | |
| NNN | Z | 200 | 20000 | 20 | ACD | Z | D1 D2 | |
| OOO | Z | 300 | 30000 | 30 | AB | Z | D1 | |
| PPP | Z | 400 | 60000 | 40 | AD | Z | D1 D2 | |
| QQQ | Z | 500 | 70000 | 90 | AE | Z | D1 D3 | |
| RRR | Z | 110 | 1100 | 11 | ACF | Z | D1 D2 D4 | |
| SSS | Z | 120 | 1200 | 12 | BCF | Z | D1 D2 D4 | |
| TTT | Z | 600 | 5000 | 70 | ADF | Z | D1 D2 D4 | |

FIG. 8

| infocube | exec count | db time | count(*) | rows after grouping | querycube | dimension list | weighted db time |
|---|---|---|---|---|---|---|---|
| N | 2 | 600 | 80000 | 60 | N | D2 | 51 |
| N | 1 | 300 | 30000 | 30 | N | D1 | 30 |
| N | 3 | 700 | 90000 | 90 | N | D1 D2 | 61 |
| N | 1 | 500 | 70000 | 90 | N | D1 D3 | 42 |
| N | 3 | 830 | 7300 | 93 | N | D1 D2 D4 | 279 |

FIG. 9

| cube | count | db time | count(*) | rows after grouping | querycube | dimension list with positions | new count(*) | weighted db time |
|---|---|---|---|---|---|---|---|---|
| N | 2 | 600 | 80000 | 60 | N | D2 | 80000 | 51 |
| N | 1 | 300 | 30000 | 30 | N | D1 | 30000 | 3 |
| N | 5 | 1300 | 90000 | 150 | N | D1(2) D2 | 170000 | 112 |
| N | 2 | 800 | 70000 | 120 | N | D1 D3(2) | 100000 | 72 |
| N | 8 | 2130 | 7300 | 243 | N | D1(2) D2 D4(3) | 177300 | 391 |

FIG. 10

| cube | count | db time | count(*) | rows after grouping | querycube | dimension list with positions | new count(*) | weighted db time |
|---|---|---|---|---|---|---|---|---|
| Z | 8 | 2130 | 7300 | 243 | Z | D1(2) D2 D4(3) | 177300 | 391 |
| Z | 5 | 1300 | 90000 | 150 | Z | D1(2) D2 | 170000 | 112 |
| Z | 2 | 800 | 70000 | 120 | Z | D1 D3(2) | 100000 | 72 |

FIG. 11

| infocube | db time | count(*) | rows after grouping | exec count |
|---|---|---|---|---|
| Z | 830 | 7300 | 93 | 3 |
| Z | 700 | 90000 | 110 | 3 |
| Z | 200 | 7300 | 93 | 3 |
| Z | 580 | 85000 | 70 | 3 |

| querycube | dimension list | date |
|---|---|---|
| Z | D1 D2 D4 | before |
| Z | D1 D1 | before |
| Z | D1 D2 D4 | after |
| Z | D1 D2 | after |

FIG. 13

| statuid | infocube | db time | count(*) | rows after grouping | characteristics | querycube | dimension list | date |
|---|---|---|---|---|---|---|---|---|
| KKK | Z | 200 | 50000 | 40 | C | N | D2 | before |
| LLL | Z | 400 | 30000 | 20 | CD | N | D2 | before |
| MMM | Z | 100 | 10000 | 50 | ABCD | N | D1 D2 | before |
| NNN | Z | 200 | 20000 | 20 | ACD | N | D1 D2 | before |
| OOO | Z | 300 | 30000 | 30 | AB | N | D1 | before |
| PPP | Z | 400 | 60000 | 40 | AD | N | D1 D2 | before |
| QQQ | Z | 500 | 70000 | 90 | AE | N | D1 D3 | before |
| RRR | Z | 110 | 1100 | 11 | ACF | N | D1 D2 D4 | before |
| SSS | Z | 120 | 1200 | 12 | BCF | N | D1 D2 D4 | before |
| TTT | Z | 600 | 5000 | 70 | ADF | N | D1 D2 D4 | before |
| AAA | Z | 11 | 1100 | 11 | ACF | N | D1 D2 D4 | after |
| BBB | Z | 12 | 1200 | 12 | BCF | N | D1 D2 D4 | after |
| CCC | Z | 60 | 5000 | 70 | ADF | N | D1 D2 | after |
| DDD | Z | 80 | 10000 | 50 | ABCD | N | D1 D2 | after |
| EEE | Z | 150 | 20000 | 20 | ACD | N | D1 D2 | after |
| FFF | Z | 350 | 55000 | 40 | AD | N | D1 D2 | after |

FIG. 12

| infocube | db time | count(*) | rows after grouping | exec count | querycube | dimension list | date | saved time |
|---|---|---|---|---|---|---|---|---|
| Z | 83 | 7300 | 93 | 3 | Z | D1 D2 D4 | after | 340 |
| Z | 580 | 85000 | 70 | 3 | Z | D1 D2 | after | 75 |
| M | 46 | 50000 | 45 | 2 | M | D1 D3 | after | 18 |
| M | 430 | 75000 | 75 | 2 | M | D1 D3 D4 | after | 301 |

FIG. 14

| infocube | db time | count(*) | rows after grouping | exec count | querycube | index columns | date | saved time |
|---|---|---|---|---|---|---|---|---|
| Z | 83 | 7300 | 93 | 3 | Z | D1 D2 D4 | after | 415 |
| M | 430 | 75000 | 75 | 2 | M | D1 D3 D4 | after | 319 |

FIG. 15

SYSTEM AND METHOD FOR ADDRESSING INEFFICIENT QUERY PROCESSING

BACKGROUND OF THE INVENTION

1. Technical Field

The present invention relates generally to query processing, and more specifically relates to a system and method for identifying predicates causing inefficient query processing, and proposing and implementing solutions to improve query performance.

2. Related Art

In an environment such as SAP BW (or any environment using star schema or complex SQL), determining the cause of slow query performance can be difficult. For instance, individual queries must be identified for analysis, and then the SQL must be captured, explained, and analyzed to determine the possible reason for the performance problem.

When end-users use drill-down in queries, additional predicates are added to the query SQL to support the grouping or selection in the drill-down. Predicates may include any element of a search condition that expresses or implies a comparison operation. This means that a user drill-down creates SQL with similar sets of predicates, which are usually based on a core set of required predicates packaged in the query. The addition (or removal) of predicates can cause changes in query performance. If, for example, a predicate which would filter well is added to a query, but the predicate is not applied early in query processing (due to missing catalog statistics, missing indexes, optimizer problems, etc.), then an automated method of finding the predicate(s) associated with the slow performance can help to reduce the effort necessary to solve the problem.

Unfortunately, there exist no automated query tools capable of determining how predicate usage impacts query performance. Accordingly, a need exists for a system and method that can both analyze predicate usage and propose solutions to improve query performance.

SUMMARY OF THE INVENTION

The present invention addresses the above-mentioned problems, as well as others, by providing a system and method for analyzing predicate usage and proposing solutions to improve query performance. In a first aspect, the invention provides a query predicate analysis system comprising: a system for collecting performance statistics for database queries; an aggregation system that organizes the performance statistics based on predicate combinations used in the database queries; and an evaluation system that compares the performances of queries having similar predicate combinations. Further features include a problem identification system that identifies a predicate, which when added to a query, results in a low performing query; and a solution proposal system that automatically proposes a solution to address the low performing query.

In a second aspect, the invention provides a method of analyzing query performance based on predicate usage, comprising: collecting performance statistics for database queries; organizing the performance statistics based on predicate combinations of the database queries; and analyzing performances of queries having similar predicate combinations.

In a third aspect, the invention provides a program product stored on a recordable medium for analyzing query performance based on predicate usage, comprising: means for collecting performance statistics for database queries; means for organizing the performance statistics based on predicate combinations of the database queries; and means for analyzing the performances of queries having similar predicate combinations.

BRIEF DESCRIPTION OF THE DRAWINGS

These and other features of this invention will be more readily understood from the following detailed description of the various aspects of the invention taken in conjunction with the accompanying drawings in which:

FIGS. 2-6 depict a set of tables related to an overview example.

FIGS. 7-15 depict a set of tables related to an SAP example.

DETAILED DESCRIPTION OF THE INVENTION

Figure 1:
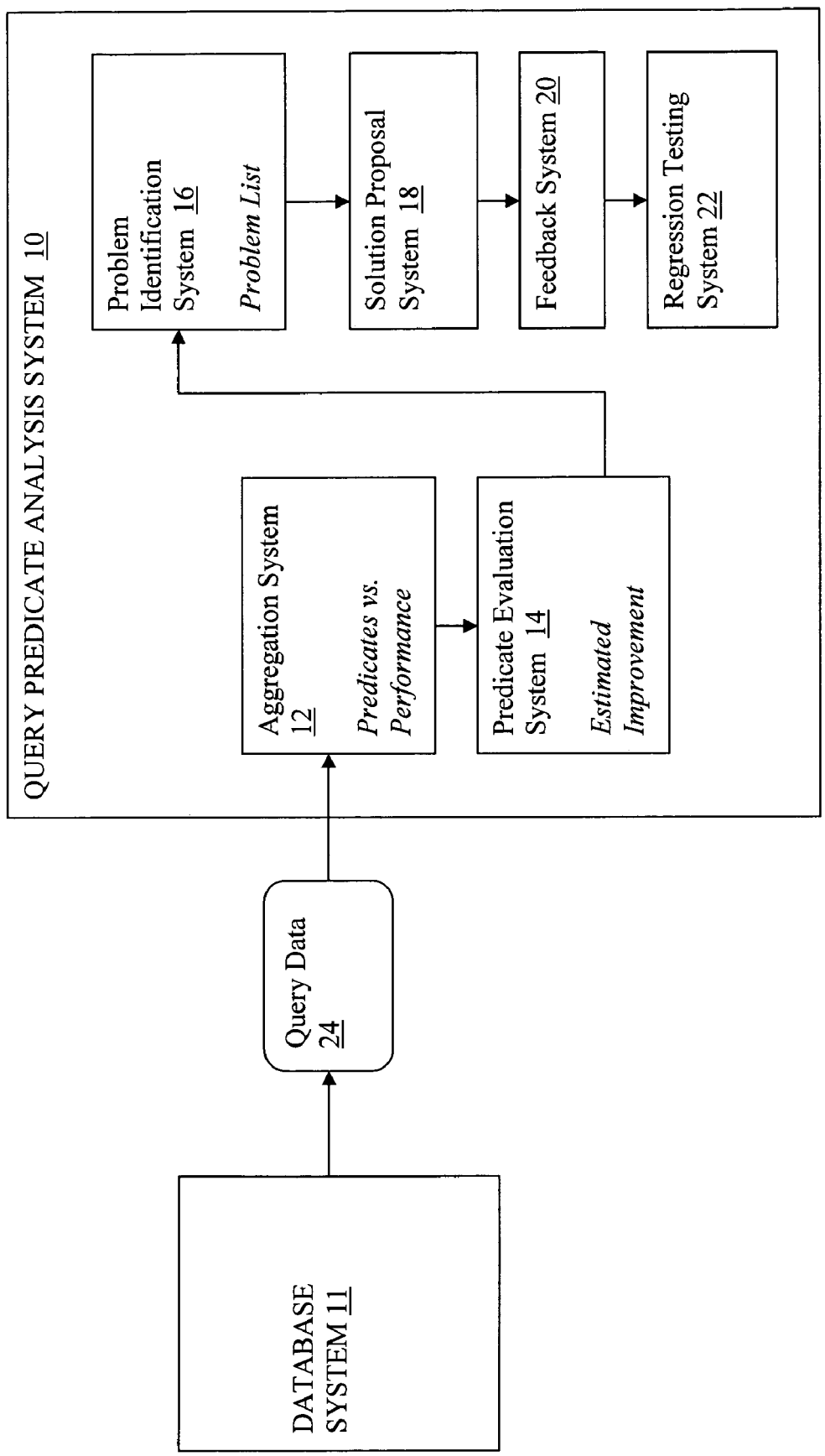
FIG. 1 depicts a query predicate analysis system in accordance with the present invention.

Referring now to the drawings, FIG. 1 depicts a query predicate analysis system 10 that operates in conjunction with a database system 11. It should be noted that system 10 could be integrated into the database system 11, or be implemented as a separate stand-alone system. Query predicate analysis system 10 examines query data 24 to improve query performance in database system 11. In particular, system 10 analyzes execution data associated with queries (e.g., query processing rate, local predicates, etc.) and compares statistics for queries having similar characteristics. More specifically, queries referencing the same fact table, and having similar predicates are analyzed and compared. System 10 then determines which predicate combinations are associated with a slowdown in query processing rates. That is, system 10 identifies predicates which when added to a query cause the new query to run more slowly than the original query. Potential problems can then be identified, and solutions can be proposed. Thus, decisions regarding candidates for changes (e.g., predicate columns, columns in tables, etc., which may need additional statistics or indexes) are made based on symptoms of problems, as indicated by query performance statistics.

The metrics used by system 10 to determine good or bad query performances may include any commonly used performance statistics. A unique feature of this process is that system 10 utilizes a data-mining process that correlates unique queries (that is, unique sets of local predicates) with their performance characteristics, and then looks at the performance of similar queries. If a slow query has predicates (e.g., ABC) that are a superset of a fast query (e.g., AB), this process examines the difference between the two sets to find the cause of the performance degradation, since the introduction of the new predicate must be related to the cause of the performance degradation It is understood that while the invention and exemplary embodiments are described generally with reference to query processing in SAP BW running, e.g., on DB2/390, the invention could be extended to any DB system that maintains statistics similar to those described below. Namely, the present invention recognizes that an important indicator of performance problems (i.e., slow selection rate per second) is the same on any platform. Accordingly, while the specific actions taken to address the identified problem might depend on the DB system being used, the general concepts described herein to identify the problem could be applied to any DB system.

The process utilizes several commonly used performance related statistics for queries, including:

(1) count(*)—rows that satisfy the predicates;
(2) query elapsed time;
(3) getpages—(GP or equivalent metric for DB data/index pages referenced); and
(4) rows processed—rows returned to the application after GROUP BY.

From the above, one derives two more commonly used metrics:

(5) query selection rate=count(*)/query elapsed time—this is the key indicator of query performance; and
(6) pages per row selected=getpages/count(*).

(Note that these statistics are currently not all available via a single interface from DB2 or SAP. At this time, they are individually available, e.g., from catalog statistics, DB2 ifcid 318, SAP query statistics, etc.).

Exemplary Overview

Consider the following example involving an exemplary star schema object (taken from the SAP BW star schema model) used in the queries below:

F—fact table with columns DIMID1, DIMID2, DIMID3, f_column1, f_column2
D1—dimension table with columns DIMID1, M1SID1, M2SID2
D2—dimension table with columns DIMID2, M3SID3, M4SID4
D3—dimension table with columns DIMID3, M5SID5, M6SID6
M1—master data table with columns M1SID1, col1, col1a, . . .
M2—master data table with columns M2SID2, col2, col2a, . . .
Etc.
M6—master data table with columns M6SID6, col6, col6a, . . .

The DIMIDx columns join the Fact to Dimension tables, and the MxSIDx columns join master data to dimension tables.

In a first step, query data 24 is gathered for each query executed, and includes information about performance and the local predicates in the SQL. For example, if the query is:

select f_column1 from F where F.DIMID1=D1.DIMID1 and F.DIMID2=D2.DIMID2 and D1.M1SID1=M1.M1SID1 and D2.M3SID3=M3.M3SID3 and M1.col1a='findone' and M3.col3a='findtwo' group by M1.col1, M3.col3, then FIG. 2 depicts an example of the query data 24 saved for each query. Since the column list must contain the set of all columns that appear in either local predicates, or in the GROUP BY clause, when columns appear in the GROUP BY, but not in the local predicates, as here:

select f_column1 from F where F.DIMID1=D1.DIMID1 and F.DIMID2=D2.DIMID2 and D1.M1SID1=M1.M1SID1
and D2.M3SID3=M3.M3SID3 and M1.col1a='findone' and M3.col3a='findtwo'
group by M1.col1, M3.col3, M4.col4.

The result would be noted in the query performance statistics as shown in FIG. 3. These raw statistics are then aggregated by aggregation system 12, which lists unique sets of local predicates and statistics for each unique predicate combination, such as that shown in FIG. 4. Thus, as shown in FIG. 4, performance statistics are organized by aggregation system 12 based on predicate combinations (e.g., columns).

Next, predicate evaluation system 14 compares queries to determine the performance differences when predicates are added to queries. In this example, statistics are gathered for queries that differ by one predicate. That is, the predicates of one query are a proper subset of the predicates in another query, and the superset contains only one additional predicate. This comparison could be done with other variants, such as comparing queries that differ by up to N predicates, or for queries that differ by only one added dimension. If there were more differences, then there would be more hypothetical fixes to be tested, as described below.

An ID number column as shown in FIG. 5-7 is added for reference purposes. The other columns are taken or computed from the summarized statistics shown in FIG. 4. Two new values are calculated:

(a) Time, which is the sum of time for queries containing the added predicate; and
(b) Estimated improvement, which is an estimate for how much time could be saved for queries with the added predicate, if they ran at the same count/second rate as the queries without the added predicate.

Estimated improvement=Time−(((count/sec with added predicate)/(count/second))*Time).

Since there is additional database (db) activity needed to process the added predicate, the estimated improvement would likely be an overstatement of the improvement, but it is a reasonable starting point for evaluating the impact.

As an alternative, statistics could be evaluated by grouping the queries by sets of tables/columns in the predicates, without operators, such as that shown in FIG. 6. If there were few queries, this could help to find patterns in the added predicate more easily. The disadvantage is that there would be more variation in the queries grouped together.

Next, for each fact table depicted in FIG. 5, queries can be ordered by "estimated improvement." Then, problem identification system 16 and solution proposal system 18 can evaluate possible causes and changes for each fact table starting with queries with the largest "estimated improvement." Problem identification system 16 can utilize any logic to identify the cause of a slowdown. For instance, if count/second has a large decrease when a predicate is added to a query, this can point to an issue such as that the new predicate filters well, but is not applied early enough in the join sequence. This can be confirmed by checking whether the GP/count has a large increase. If there is a large increase in GP/count, it means that the database system 11 had to search more pages to find the qualifying rows. The query statistics in FIG. 5, ID number 1, are an example of this.

In one exemplary embodiment, problem identification system 16 may select the identified problem from a "problem list." An exemplary problem list for a slowdown in count/second may, e.g., include the following:

(1) missing or insufficient statistics on the added column (so database system 11 cannot make the best optimizer choice);
(2) missing index on new column (again, database system 11 cannot make the best optimizer choice);
(3) missing multi-column index on the fact table (in the case there are multiple filtering predicates in different dimensions);
(4) predicate operator is not index matching (e.g., "status not delivered," rather than "status in (backordered, open)"); and
(5) there is correlation between the added predicate column and a column in the base comparison set of predicates.

Next, solution proposal system 18 could propose possible solutions. Changes could be proposed for administrators, or using feedback outlined below, could be automatically added and tested. Having found a predicate (or table.column) which when added slows the query, problem identification system 16 and solution proposal system 18 can make a hypothesis as to the cause based on the possible problems listed above (or other possible reasons) and then implement a solution. For example, check for column statistics in DB catalog, and create them if they do not exist, or check for indexes containing the column, and add one if it does not exist, and so on.

A feedback system 20 can be utilized to assess the efficacy of an implemented solution. As feedback, after the proposed fix has been implemented, query statistics as shown in FIG. 4 for the period before and after the change can be compared. If the count/second rate improves, then the proposed fix would be retained. If the performance did not improve, then the proposed fix would be removed, and another proposed fix could be implemented and evaluated, based on the list of possible solutions to the problem, as outlined above.

A regression testing system 22 could also be implemented to assess the overall impact of an implemented solution. As a regression test, one would need to evaluate the performance statistics of queries referencing the changed element. If a new column index on a master data table were created, all queries referencing that column (found in the local predicates in FIG. 4) would be examined. Likewise, if a new multi-column fact table index were created, all queries using the dimensions in the index (found in the dimensions column in FIG. 4) would be examined to determine if they improved, or ran slower.

Exemplary SAP Implementation

SAP currently provides, via its RSA1 transaction, a method of proposing aggregates (summary tables) based on characteristics (i.e., predicates) used in queries. Characteristics are columns in dimension tables or master data tables of the star schema. Such summary tables can help to improve performance of frequently executed queries that use characteristics matching the aggregates.

In an ad-hoc query environment, where an aggregate may not be suitable for improving query performance, due to the wide variety of characteristics used in the queries, adding new multi-column indexes on the fact table can help to improve performance. A multicolumn fact-table index containing only index columns for the dimensions used in a query can provide access to the fact table that is more efficient than access with the standard SAP index structure. The standard SAP index structure is made up of M single column indexes for the M dimensions of the fact table, and a single M column index containing columns for all the M dimensions on the fact table.

This method is based on the observation made on SAP systems that when the rate of "rows selected per second" is slow, the cause may be that a bad join order was used by DB2, such that the best filtering dimensions were applied after the fact table is accessed. If the filtering dimensions are applied after the fact table is accessed, DB2 must read many extraneous rows out of the fact table, which are filtered after the fact table is accessed, which reduces the "selected per second" rate. This method recognizes the symptom of a possible join order problem, proposes an index, and then checks the performance of the index to determine whether the index helped and should be kept.

Since SAP query statistics are gathered based on characteristics, which reside in dimensions or master data tables, and DB2 indexes are created based on dimensions, a method is needed to determine the dimensions where the characteristics reside, and to determine the sets of dimensions used by the queries. Once the sets of dimensions used by slow queries are found, a method is needed to order the index columns for the dimensions.

In the past, this problem was "solved" by examining the SQL for long running queries: explaining the statement, and determining the dimensions used. This method is based on sampling, and can be automated.

The present invention addresses this problem as follows. For each query executed, characteristic columns are converted to dimensions to determine a set of dimensions used by the query. Then, all queries in the evaluation interval are summarized to evaluate the total DB time (and then weight) of queries using each unique set of dimensions. If two dimension combinations support queries with similar aggregate db time, but one dimension combination has a slower 'count(*)/second' rate, the dimension combination with the slower rate will be favored as an index creation candidate. Based on the weight of each dimension combination, new multi-column indexes on fact tables are proposed to optimize access to the fact table.

The process is based on symptoms of access path problems (that is, low 'rows selected per second' rate) rather than based on analysis of predicates and database statistics.

The process contains a feedback loop, where the benefit of new indexes can be tested, to determine if the problem symptom (slow select rate) was helped by the new index. Query statistics are aggregated before and after creation of an index, and the 'count(*)/second' rate is compared for groups of queries using the same set of dimensions. If the count(*)/second rate improves with a new index, then the new index has helped performance.

The process contains a weighting system for created indexes, where different indexes can be evaluated, to determine which provides the most benefit to system performance. The performance benefit of a new index is used in conjunction with the query statistics to determine the 'time saved' by the new index. Different indexes can be compared, to determine which has the largest 'time saved', and thus the largest impact on performance.

(A) Proposal of New Multi-column Fact Table Indexes

The first step (Step 1) is to extract information about query statistics over a time interval, and build an array of statistics rows, where each row contains the columns:

a) STATUID—the unique query identifier in SAP
b) Infocube specified at query execution (from RSDDSTAT.INFOCUBE)
c) DB request time (from RSDDSTAT.QTIMEDB)
d) Rows satisfying the predicates—that is, count(*) (RSDDSTAT.QDBSEL)
e) Rows after grouping (RSDDSTAT.QDBTRANS)
f) characteristics (collect all values of RSDDSTATAGGRDEF.IOBJNM where RSDDSTATAGGRDEF.AGGRSTNE space)
g) querycube used at execution time (RSDDSTATAGGRDEF.QUERYCUBE)
h) dimensions (empty at this stage)

FIG. 7 depicts a sample from the first step containing four queries. In a second step (step 2), the dimensions are concatenated and sorted as follows:

for each row in the array built above:
    for each unique characteristic (IOBJNM) in the row

```
select dimension from RSDDIMEIOBJ where
    RSDDIMEIOBJ.INFOCUBE=querycube and
    RSDDIMEIOBM.IOBJNM=characteristic
  concatenate the dimension to the current dimension list,
    if it is not a member of the list
  endfor characteristic
  sort the dimension list
endfor row
```

If an SAP data dictionary (table RSDDIMEIOBJ) contains:

| dimension | infocube | iobjnm |
|---|---|---|
| D1 | Z | A |
| D1 | Z | B |
| D2 | Z | C |
| D2 | Z | D |
| D3 | Z | E |
| D4 | Z | F |

Then step 2 yields an array containing rows such as these, where there is one row for each SAP query, querycube pair, as shown in FIG. 8.

The next step (step 3) is to merge (i.e., aggregate) all rows containing identical dimension lists, summing db time, count(*), and rows after grouping, and creating execution count. "Weighted db time" is (db time/sqrt(count(*)/db time)), in order to give larger weight to dimension combinations that return data slower. For example:

| db time | dimensions | count(*) | weighted db time |
|---|---|---|---|
| 100 | D1 D3 | 100000 | 3.16 |
| 60 | D3 D4 | 10000 | 4.64 |

So in this case, even though D3 D4 has a smaller db time, it has a higher weighted db time, due to its slow 'count(*)/db time' ratio.

Other formulas could be used to create a "weighted db time," depending on how much one wants to favor slow dimension combinations. The goal of the formula is that if there are two dimension combinations with similar db time, that the combination with slow count(*)/dbtime will be favored as a candidate for index creation. See for instance FIG. 9.

Next, proposed index column order can be assigned in the following way:

```
for each row in array (3) where the count of dimensions is
  more than one
  recursively on the dimensions of the row starting with the
    dimension count (X) until the count of dimensions is 1
    find the set of X−1 dimensions with the largest
      "weighted db time" whose dimensions are a proper
      subset of the set of X dimensions
    assign position X to the dimension which is in the set
      of X dimensions, but not in the set of X−1 dimen-
      sions with the longest "weighted db time"
    add the exec count, db time, count(*), rows after
      grouping, and weighted db time for the set of X−1
      dimensions with the longest weighted db time to the
      statistics for the X dimension set
    reduce X by 1
  end recursion
end for each row
```

This yields the table depicted in FIG. 10. Next, as shown in FIG. 11, the list is ordered by count of dimensions, and weighted db time; the single column indexes is deleted since by default there are already single-column indexes for each dimension of the fact table.

For each N, where N is the count of dimensions in the proposed index, the set of dimensions with the longest query database time, and thus the greatest potential for improvement, would be at the top of the list. One could adjust the process to discard any proposed indexes with more than N columns. If an index with N columns were chosen for creation, then any indexes with fewer columns, where the smaller indexes match the leading columns of the N column index, would not be creation candidates, as these smaller indexes are contained in the N column index.

(B) Feedback to Evaluate Effectiveness of Indexes

After a multi-column index has been created on the fact table, the query statistics for queries before and after the creation of the index can be compared, to determine if the index has improved performance, such as that shown in FIG. 12. Summing the queries by dimension list, before and after the addition of the index, yields the table depicted in FIG. 13.

Next, for each unique set of dimensions, the performance benefit of the indexes is calculated, by computing the ratio of count(*)/second after and before for each set of characteristic combinations contained in the indexes:

D1 D2 D4→(7300/200)/(7300/830)=36.5/8.79=4.15

Three dimension queries execute 415% times faster than before.

D1 D2→(85000/580)/(90000/700)=146.55/128.57=1.13

Two dimension queries execute 13% faster than before.

If the index helped some queries, and hindered others, then the total valuation done below will calculate the total benefit of the index, to determine if the index should be kept.

(C) Comparing Multi-column Indexes, to Determine Which Provides More Benefit:

If there are several multi-column indexes that have been created, one can evaluate which provides the largest overall system benefit. Having computed the performance benefit from a new index for individual characteristic combinations, one can compare indexes in this way:

| Index Columns | querycube | Performance benefit |
|---|---|---|
| D1 D2 D4 | Z | 4.15 |
| D1 D2 | Z | 1.13 |
| D1 D3 | M | 1.4 |
| D1 D3 D4 | M | 1.7 |

First, the saved time based on the query statistics is computed as shown in FIG. 14 wherein: savedtime=((db time*perf benefit)−db time). Next, as shown in FIG. 15, all the characteristic combinations that could be supported by each index are summed. If saved time is negative, then the index has hindered performance, and would be deleted.

(D) Note on Symptom Based Evaluation

When a new index with high 'weighted db time' is proposed in step 1, the index performance benefit can be calculated (Section B) to verify that it helped performance, and then the index can be compared to existing indexes (Section C), to determine from among several indexes which index is least valuable, in order to delete indexes which provide little benefit.

The valuation process (Section B) and comparison process (Section C) do not need to know whether the new index was used at execution time. They are symptom based, and not access path based. The feedback uses symptoms (that is a change in the rate of rows per second) to determine whether the index helped or not. It is not necessary to explain the statement and find the access path, to determine whether the change was helpful. In fact, if the new index was used, and caused performance to be worse, the feedback process and index valuation would recognize that so the index could be deleted.

This method does not estimate the value of an index before it is created. It looks for index candidates, and evaluates them after creation, to learn what worked, and what did not work.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A method of analyzing query performance based on predicate usage, comprising:

collecting performance statistics for database queries comprising database statements entered by end-users having different predicate combinations;

organizing the performance statistics based on the different predicate combinations of the database queries;

analyzing performance of a subset of the database queries having different predicate combinations that include common predicates;

generating analysis results; and identifying a problem from a list consisting of: missing statistics on an added column, missing index on new column, missing multi-column index on a fact table, and predicate contains a non-indexable operator.

2. The method of claim 1, comprising the further step of automatically proposing a solution to address a database query from the subset of database queries identified as a low performer.

3. The method of claim 2, comprising the further step of comparing the performance of a second subset of database queries before and after an implementation of a proposed solution.

4. The method of claim 1, wherein the performance statistics include: rows that satisfy a set of predicates, query elapsed time, index pages referenced, and rows processed.

5. The method of claim 4, wherein the step of analyzing performance includes the step of calculating an estimate improvement for adding a predicate given by: Estimated improvement=Time−(((count/second with added predicate)/(count/second))*Time), where Time is a sum of time for database queries containing an added predicate, count/second is a rate for running a database query without the added predicate and count/second with added predicate is a rate for running the database query with the added predicate.

6. A method of analyzing query performance based on predicate usage, comprising:

collecting performance statistics for database queries comprising database statements entered by end-users having different predicate combinations;

organizing the performance statistics based on the different predicate combinations of the database queries;

analyzing performance of a subset of the database queries having different predicate combinations that include common predicates, wherein analyzing performance includes the step of calculating an estimate improvement for adding a predicate given by: Estimated improvement=Time−(((count/second with added predicate)/(count/second))*Time), where Time is a sum of time for database queries containing an added predicate, count/second is a rate for running a database query without the added predicate and count/second with added predicate is a rate for running the database query with the added predicate; and generating analysis results.

* * * * *